(12) United States Patent
Holtcamp et al.

(10) Patent No.: US 9,376,559 B2
(45) Date of Patent: Jun. 28, 2016

(54) REVERSE STAGED IMPACT COPOLYMERS

(71) Applicant: ExxonMobil Chemical Patents Inc., Baytown, TX (US)

(72) Inventors: Matthew W. Holtcamp, Huffman, TX (US); Laughlin G. McCullough, League City, TX (US); Celestino M. Perez, Jr., Pasadena, TX (US); Sarah J. Mattler, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/525,766

(22) Filed: Oct. 28, 2014

(65) Prior Publication Data

US 2015/0147552 A1    May 28, 2015

Related U.S. Application Data

(60) Provisional application No. 61/907,781, filed on Nov. 22, 2013.

(51) Int. Cl.

| C08F 2/00 | (2006.01) |
| C08F 4/6592 | (2006.01) |
| C08L 23/16 | (2006.01) |
| C08L 23/08 | (2006.01) |
| C08L 23/14 | (2006.01) |
| C08L 23/06 | (2006.01) |
| C08J 5/18 | (2006.01) |
| C08L 23/04 | (2006.01) |
| C08F 4/659 | (2006.01) |

(52) U.S. Cl.
CPC .............. C08L 23/142 (2013.01); C08F 2/001 (2013.01); C08J 5/18 (2013.01); C08L 23/04 (2013.01); C08L 23/06 (2013.01); C08L 23/08 (2013.01); C08F 4/65912 (2013.01); C08F 4/65916 (2013.01); C08J 2323/04 (2013.01); C08J 2323/06 (2013.01); C08J 2323/14 (2013.01); C08L 2205/02 (2013.01); C08L 2314/06 (2013.01)

(58) Field of Classification Search
CPC .. C08F 2/001; C08F 4/65904; C08F 4/65927; C08L 23/08; C08L 2314/06
See application file for complete search history.

(56) References Cited

U.S. PATENT DOCUMENTS

| 4,375,531 | A | 3/1983 | Ross |
| 4,459,385 | A | 7/1984 | McCullough, Jr. |
| 4,535,125 | A | 8/1985 | McCullough, Jr. |
| 5,066,723 | A | 11/1991 | Randall, Jr. et al. |
| 6,117,962 | A * | 9/2000 | Weng ............... C08F 110/06 526/127 |
| 6,355,747 | B1 | 3/2002 | Rausch et al. |
| 6,384,142 | B1 | 5/2002 | Burkhardt et al. |
| 6,569,965 | B2 * | 5/2003 | Markel ............... C08F 10/06 526/133 |
| 6,960,676 | B2 | 11/2005 | Rix et al. |
| 7,122,498 | B2 | 10/2006 | Hart et al. |
| 7,223,822 | B2 * | 5/2007 | Abhari ............... C08F 10/00 525/245 |
| 7,531,605 | B2 | 5/2009 | Machida et al. |
| 7,741,417 | B2 | 6/2010 | Casty et al. |
| 7,851,644 | B2 | 12/2010 | Ewen et al. |
| 8,076,419 | B2 | 12/2011 | Meka et al. |
| 8,202,958 | B2 | 6/2012 | Demirors et al. |
| 8,623,974 | B2 * | 1/2014 | Jiang ............... C08F 210/06 526/134 |
| 2004/0210002 | A1 | 10/2004 | Haerkoenen et al. |
| 2004/0210013 | A1 | 10/2004 | Brant |
| 2007/0225455 | A1 | 9/2007 | Jiang et al. |
| 2008/0033107 | A1 | 2/2008 | Wouters et al. |
| 2010/0152388 | A1 | 6/2010 | Jiang et al. |
| 2011/0172375 | A1 | 7/2011 | Yeh et al. |
| 2011/0274860 | A2 | 11/2011 | Backman et al. |
| 2012/0141702 | A1 | 6/2012 | Shim et al. |
| 2014/0121325 | A1 | 5/2014 | Holtcamp et al. |

FOREIGN PATENT DOCUMENTS

| EP | 0 405 201 | 11/1994 |
| EP | 0 798 306 | 3/1997 |
| EP | 1041090 | 10/2000 |
| WO | WO 98/27102 | 6/1998 |
| WO | WO 02/46251 | 6/2002 |

OTHER PUBLICATIONS

Yang, Q. et al., "Alternative View of Long Chain Branch Formation by Metallocene Catalysts," Macromolecules, 2010, vol. 43(21), pp. 8836-8852.

\* cited by examiner

*Primary Examiner* — Caixia Lu
(74) *Attorney, Agent, or Firm* — Priya G. Prasad

(57) ABSTRACT

This invention relates to processes to prepare impact copolymers having an ethylene content of greater than 20 wt % using a process where ethylene polymer is made in the first stage and propylene polymer is made in the second stage.

22 Claims, No Drawings

REVERSE STAGED IMPACT COPOLYMERS

PRIORITY

This invention claims priority to and the benefit of U.S. Ser. No. 61/907,781, filed Nov. 22, 2013.

FIELD OF THE INVENTION

This invention is directed toward processes to prepare polymers having an ethylene content of greater than 30 wt % in relation to propylene and functioning as impact copolymers.

BACKGROUND OF THE INVENTION

Polypropylene materials which have been modified to improve resistance to impact are generally referred to as impact-modified polypropylenes. Heretofore, impact resistance of polypropylene has been improved by blending impact resistant materials such as elastomeric ethylene-propylene copolymers therewith or by reacting therewith other polymers or copolymers to produce reactor blends typically referred to as impact copolymers (ICPs). There is, however, a tradeoff with other properties, e.g., stiffness and flow characteristics, when such polypropylene materials are impact-modified. For example, U.S. Pat. No. 4,459,385 discloses that impact-modified polypropylenes obtained by sequential polymerization of propylene, and ethylene and propylene, to obtain an impact copolymer of polypropylene homopolymer and elastomeric ethylene-propylene copolymer, while having good impact resistance at low temperatures, have decreased stiffness. This reference suggests that as a general rule, impact resistance increases and stiffness decreases with increasing amounts of elastomer in the total composition; and that the decrease in stiffness can be compensated for by blending with the impact-modified material a linear low density polyethylene (LLDPE) having a melt flow index not exceeding 5 dg/min.

U.S. Pat. No. 4,535,125 discloses that impact-modified polypropylenes blended with a LLDPE have poor flow performance and that such flow performance is improved through visbreaking. That is, the melt flow rate of the blend of impact copolymer and LLDPE can be increased by extruding the blend in the presence of certain peroxide materials. Thus, impact-modified polypropylenes are blended with a LLDPE having a melt flow index of from 5 to 50 dg/min and the blends are visbroken to obtain impact-resistant polypropylene materials which have good stiffness characteristics as well as good flow characteristics.

Other methods of preparing impact-modified polypropylenes are also known. For example, U.S. Pat. No. 4,375,531 discloses blends of a first component selected from a group of medium impact polymeric materials with a second component selected from a group of high impact polymeric materials which blends are visbroken to improve the flow characteristics thereof.

Traditional ICP's utilizing metallocenes can be prepared as described in U.S. Pat. No. 7,122,498. These ICP's are first subjected to propylene to provide polypropylene resin particles. The polypropylene resin particles are then subjected to an ethylene/propylene gas mixture to form ethylene propylene rubber in the pores of the polypropylene resin particles. However, ICPs performance properties have been inhibited by the inability to increase the amount of rubber or ethylene within the ICP. Attempts to increase rubber content beyond 30 weight percent in many cases result in severe operability issues in the reactors. Furthermore, ICPs prepared with single site catalysts have been limited due to the low pore volume capability of metallocene-based iPP.

Further, EP 1 041 090 and WO 02/46251 disclose multi-stage polymerizations where two ethylene polymers are made in multiple stages.

Other references of interest are U.S. Pat. No. 5,066,723 and US 2014/0121325 A1.

In summary, there is a need to prepare ICPs with rubber content greater than 30 weight percent. Ideally, the process to prepare the ICP would not foul the reactor during production.

SUMMARY OF THE INVENTION

This invention relates to processes to produce polymer compositions, such as impact copolymers (ICPs) utilizing a single metallocene catalyst by first polymerizing ethylene, and then (preferably with the same catalyst), polymerizing propylene in the presence of the polyethylene. Typically, propylene is first polymerized and then modified with ethylene, ethylene polymers by blending and/or by modifying with ethylene/propylene copolymers. By reversing the order of polymerizations and by selecting an appropriate catalyst, ICPs with ethylene content of greater than 30 weight percent are achieved.

In one aspect, the processes described herein provide for ethylene-based in-reactor compositions comprising:

1) contacting ethylene and, optionally, a $C_2$ to a $C_{12}$ alpha-olefin comonomer under polymerization conditions in a first stage in the presence of a first metallocene catalyst system to form Component A;

2) contacting Component A of step a) with a $C_3$ to a $C_{12}$ alpha-olefin monomer under polymerization conditions in a second stage in the presence of a second metallocene catalyst system to form Component B, wherein the first metallocene catalyst system is present in both steps a and b and/or additional metallocene catalyst is added to the reaction mixture between steps a and b and the first metallocene catalyst system may be the same as the second metallocene catalyst system; and 3) obtaining an ethylene-based in-reactor composition comprising Component A and Component B, wherein the ethylene-based in-reactor composition has from greater than 30% to about 85% of ethylene on a mole percentage. In one aspect the ethylene-based in-reactor composition has a multimodal melting point.

In another aspect, an ICP is provided that has an ethylene content of greater than 30 mol %, preferably greater than about 40 mol %, more preferably greater than about 50 mol % and even more preferably greater than about 65 mol %, more preferably greater than 85 mol %. Therefore, certain embodiments include compositions prepared by the processes described herein.

In still another aspect, the reaction sequence of step 1 and step 2 can be carried out immediately. Alternatively, there can be a period of time between generating the polyethylene and further reacting the polyethylene with propylene of 1 second or more, alternately 30 seconds or more, alternately 1 minute or more, alternately 15 minutes or more, alternately 30 minutes or more, alternately 1 hour or more, alternately 2 hours or more, alternately 1 day or more.

DETAILED DESCRIPTION

For the purposes of this invention and the claims thereto, the new numbering scheme for the Periodic Table Groups is used as described in CHEMICAL AND ENGINEERING NEWS, 63(5), p.

27 (1985). Therefore, a "Group 4 metal" is an element from Group 4 of the Periodic Table, e.g., Hf, Zr and Ti.

"Polyolefin" means an oligomer or polymer of two or more olefin mer units and specifically includes oligomers and polymers as defined below. An "olefin," alternatively referred to as "alkene," is a linear, branched, or cyclic compound of carbon and hydrogen having at least one double bond. A "monoolefin" has one double bond, for example, an alpha, omega, pendant, or internal double bond.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like.

An oligomer is typically a polymer having a low molecular weight (such as an Mn of less than 25,000 g/mol, preferably less than 2,500 g/mol) or a low number of mer units (such as 75 mer units or less, typically 50 mer units or less, even 20 mer units or less, even 10 mer units or less). An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

The term "continuous" means a system that operates without interruption or cessation. For example, a continuous process to produce a polymer would be one where the reactants are continually introduced into one or more reactors and polymer product is continually withdrawn.

As used herein, Mn is number average molecular weight, Mw is weight average molecular weight, Mz is z average molecular weight, wt % is weight percent, mol % is mole percent, and vol % is volume %. Molecular weight distribution (MWD), also referred to as polydispersity (PDI), is defined to be Mw divided by Mn. Unless otherwise noted, all molecular weights (e.g., Mw, Mn, Mz) are g/mol and are determined by GPC-DRI as described in the Examples section below. Unless otherwise noted, all mol % are determined by $^{13}$C NMR as described in the Examples section below.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane, OTf is trifluoromethanesulfonate.

Room temperature (RT) is 23° C. unless otherwise indicated.

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of this invention and claims thereto in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group, as opposed to a "substituted hydrocarbyl" which is defined as a radical made of carbon and hydrogen where at least one hydrogen is replaced by a heteroatom or heteroatom containing group.

The terms "hydrocarbyl radical," "hydrocarbyl," and "hydrocarbyl group" are used interchangeably throughout this document. Likewise the terms "group" and "substituent" are also used interchangeably in this document. For purposes of this invention, "hydrocarbyl radical" is defined to be $C_1$ to $C_{20}$ radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

A "substituted alkyl" is an alkyl radical made of carbon and hydrogen where at least one hydrogen is replaced by a heteroatom, a heteroatom containing group, or a cyclic substituted or unsubstituted hydrocarbyl group having 1 to 30 carbon atoms.

A "substituted aryl" group is an aryl radical made of carbon and hydrogen where at least one hydrogen is replaced by a heteroatom, a heteroatom containing group, or a linear, branched, or cyclic substituted or unsubstituted hydrocarbyl group having 1 to 30 carbon atoms.

A "heteroatom containing ring" is a cyclic ring where one or more ring vertices are occupied by a heteroatom (N, O, P, S). For example, tetrahydrofuran is a heteroatom containing ring having an oxygen atom as part of the ring backbone.

An "anionic ligand" is a negatively charged ligand which donates one or more pairs of electrons to a metal ion. A "neutral donor ligand" is a neutrally charged ligand which donates one or more pairs of electrons to a metal ion.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Impact Copolymer Process

Impact Copolymer (ICP) polymers and processes to produce them are described herein. These polymers are the reaction product(s) from a first metallocene based ethylene polymerization step followed by a second metallocene based propylene polymerization step in the presence of the polyethylene and without the need to change catalysts. Furthermore, additional metallocene catalyst can be added to the reaction as the process moves from the initial polymerization of ethylene to the polymerization of propylene to produce the ICPs. Preferably, it is not necessary to add catalyst in between the step of treating the polyethylene with propylene and/or other alpha-olefins.

In one embodiment, a process to produce polymers, such as ICPs, is described. The process includes the steps of 1) contacting ethylene and optionally a $C_3$ to a $C_{12}$ alpha-olefin comonomer with a supported bis indenyl catalyst and, optionally, an activator which provides a reaction mixture comprising an ethylene polymer; and 2) contacting the ethylene polymer of step 1) with a $C_3$ to a $C_{12}$ alpha-olefin monomer, wherein the supported bis indenyl catalyst is present in both steps 1 and 2 and/or additional metallocene catalyst is added to the reaction mixture between steps 1 and 2; and wherein the polymer composition has from greater than 30 mol % to about 85 mol % ethylene.

In one aspect, an ICP is provided that has greater than 30 mol % ethylene, preferably greater than about 40 mol % ethylene, more preferably greater than about 50 mol % ethylene, and even more preferably greater than about 65 mol % ethylene, more preferably greater than about 85 mol % ethylene.

The ICP reaction products and processes to produce them are discussed further below.

Catalysts

Metallocene Catalyst Systems

A metallocene catalyst system is preferably used to produce the polymers of the in-reactor compositions of this invention. Preferably, a metallocene catalyst system is also used in steps 1 and 2 of the in-reactor compositions of this invention. Most preferably, the same metallocene catalyst system is used to produce polymers from steps 1 and 2 of the in-reactor compositions of this invention.

The metallocene catalyst system used herein comprises: (i) a metallocene compound comprising a group 4, 5, or 6 metal; (ii) an activator (preferably an alumoxane or an ionic stoichiometric activator); and (iii) a support material. Each of these are discussed in turn, below.

Metallocene Compounds

The metallocene catalyst system in the second stage preferably comprises a metallocene compound represented by one of the following formulae (I), (II), (III), or (IV).

In some embodiments of this invention, the metallocene compound is represented by the formula (I):

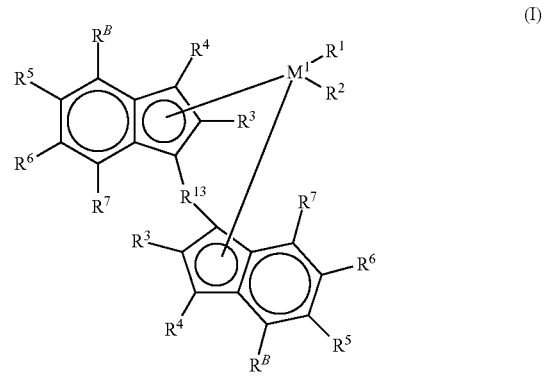

(I)

wherein:

$M^1$ is selected from titanium, zirconium, hafnium, vanadium, niobium, tantalum, chromium, molybdenum and tungsten (preferably $M^1$ is selected from titanium, zirconium, hafnium; preferably $M^1$ is zirconium);

$R^1$ and $R^2$ are selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; optionally $R^1$ and $R^2$ are joined together to form a $C_4$ to $C_{40}$ alkanediyl group or a conjugated $C_4$ to $C_{40}$ diene ligand which is coordinated to $M^1$ in a metallacyclopentene fashion; optionally $R^1$ and $R^2$ represent a conjugated diene, optionally substituted with one or more groups independently selected from hydrocarbyl, trihydrocarbylsilyl and trihydrocarbylsilylhydrocarbyl groups, said diene having a total of up to 40 atoms not counting hydrogen and forming a π complex with $M^1$ (preferably $R^1$ and $R^2$ are selected from chlorine, $C_1$ to $C_6$ alkyl groups, $C_6$ to $C_{10}$ aryl groups, $C_7$ to $C_{12}$ arylalkyl groups and $C_7$ to $C_{12}$ alkylaryl groups; more preferably $R^1$ and $R^2$ are methyl groups);

each $R^3$ and $R^B$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups (preferably $R^3$ is selected from $C_3$ to $C_6$ alkyl groups and phenyl; more preferably $R^3$ is an isopropyl group);

$R^4$, $R^5$, $R^6$, and $R^7$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and $C_7$ to $C_{40}$ substituted or unsubstituted arylalkenyl groups (preferably $R^4$ is hydrogen or a $C_1$ to $C_{10}$ alkyl groups; preferably each of $R^5$, $R^6$, and $R^7$ are substituted or unsubstituted $C_1$ to $C_{10}$ alkyl groups, preferably ethyl, isopropyl, alkoxy, amido, carbazoles or indoles; preferably $R^4$, $R^5$, $R^6$, and $R^7$ are each hydrogen); and $R^{13}$ is selected from:

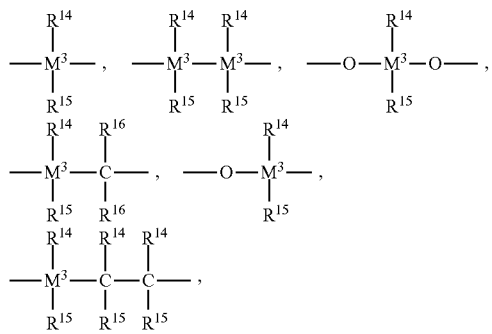

—B($R^{14}$)—, —Al($R^{14}$)—, —Ge—, —Sn—, —O—, —S—, —SO—, —SO$_2$—, —N($R^{14}$)—, —CO—, —P($R^{14}$)—, and —P(O)($R^{14}$)—;

wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups, and $C_7$ to $C_{40}$ alkylaryl groups, optionally, $R^{14}$ and $R^{15}$, together with the atom(s) connecting them, form a ring; and $M^3$ is selected from carbon, silicon, germanium, and tin; or $R^{13}$ is represented by the formula:

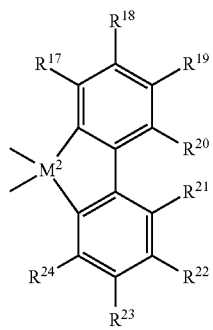

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups and substituted or unsubstituted $C_8$ to $C_{40}$ arylalkenyl groups; optionally two or more adjacent radicals $R^{17}$, $R^{18}$, $R^{19}$, $R^{20}$, $R^{21}$, $R^{22}$, $R^{23}$, and $R^{24}$, including $R^{20}$ and $R^{21}$, together with the atoms connecting them, form one or more rings; and $M^2$ represents one or more carbon atoms, or a silicon, germanium, or tin atom (preferably each $R^B$ is hydrogen, $R^{13}$ is Si(CH$_3$)$_2$, and $M^1$ is zirconium; alternately each $R^3$ is methyl, each $R^B$ is hydrogen, $R^{13}$ is Si(CH$_3$)$_2$, and $M^1$ is zirconium; alternately each $R^B$ is phenyl, each $R^3$ is methyl, $R^{13}$ is Si(CH$_3$)$_2$, and $M^1$ is zirconium).

In preferred embodiments, the metallocene compound is represented by the formula:

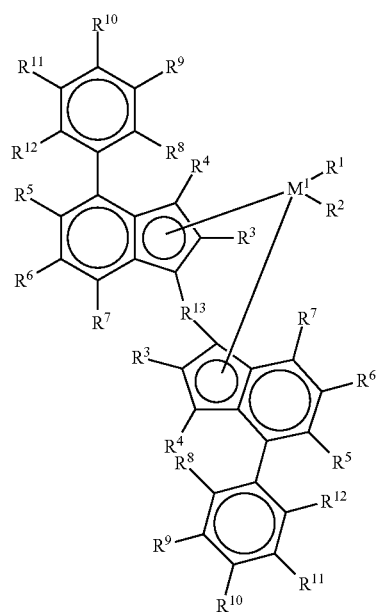

wherein:

$M^1$; $R^1$ and $R^2$; $R^3$; $R^4$, $R^5$, $R^6$, $R^7$, and $R^{13}$ are as defined above (preferably each $R^3$ is independently selected from isopropyl, isobutyl, sec-butyl, tert-butyl and phenyl groups, and each $R^{12}$ is independently selected from n-propyl, isopropyl, n-butyl, isobutyl, sec-butyl, tert-butyl, phenyl, tolyl, benzyl. and naphthyl groups);

$R^8$, $R^9$, $R^{10}$, and $R^{11}$ are each independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is as defined above; and $R^{12}$ is selected from halogen, substituted or unsubstituted $C_2$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted C₇ to C₄₀ arylalkyl groups, substituted or unsubstituted C₇ to C₄₀ alkylaryl groups, substituted or unsubstituted C₈ to C₄₀ arylalkenyl groups, and —NR'₂, —SR', —OR', —SiR'₃, —OSiR'₃, and —PR'₂ radicals, wherein each R' is as defined above (preferably each $R^{12}$ is independently selected from substituted or unsubstituted $C_1$ to $C_6$ alkyl groups and substituted or unsubstituted $C_6$ to $C_{10}$ aryl groups; more preferably, at least one $R^{12}$ is phenyl). Such metallocene compounds are further described in U.S. Pat. No. 7,122,498, which is fully incorporated herein.

Preferably, the metallocene compound is represented by one or more of the formulae:

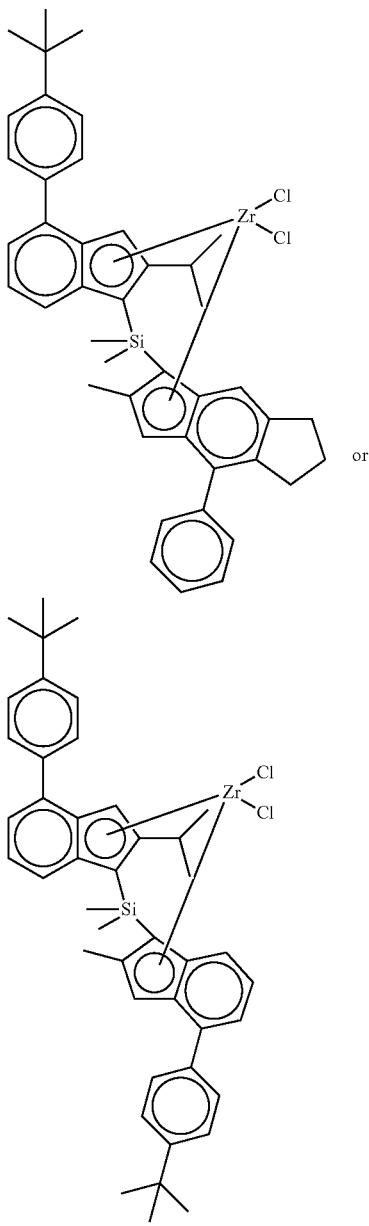

or the dimethyl analogs thereof.

Such metallocene compounds are further described in U.S. Ser. No. 61/720,555, entitled "Supported Metallocene Catalyst Systems and Methods of Preparation Thereof" and fully incorporated herein by reference.

In other embodiments of this invention, the metallocene compound is represented by the formula (II):

$$(Cp)_m R^A_n M^4 Q_k \quad (II)$$

wherein each Cp is a cyclopentadienyl or a cyclopentadienyl substituted by one or more hydrocarbyl radical having from 1 to 20 carbon atoms (preferably alkyl, alkenyl, aryl, arylalkyl, or alkylaryl radicals having from one to 20 carbon atoms; preferably methyl, ethyl, propyl, isopropyl, butyl, butenyl, isobutyl, amyl, phenyl; preferably Cp is cyclopentadienyl and/or fluorenyl);

$R^A$ is a structural bridge between two Cp rings (preferably R is selected from the group consisting of dialkylsilicon groups having $C_1$ to $C_4$ alkyl substituents, which may be the same or different, and of alkadiyl radicals having 1 to 4 carbon atoms, preferably 2,2 propanediyl), alternately $R^A$ is as defined for $R^{13}$ above;

$M^4$ is a transition metal selected from groups 4 or 5 (preferably Ti, Zr, and Hf);

Q is a hydride or a hydrocarbyl group having from 1 to 20 carbon atoms or an alkenyl group having from 2 to 20 carbon atoms, or a halogen (preferably a halogen), alternately Q is as defined for $R^1$ above;

m is 1, 2, or 3, with the proviso that if m is 2 or 3, each Cp may be the same or different (preferably m=2);

n is 0 or 1, with the proviso that n=0 if m=1 (preferably n=1); and k is such that k+m is equal to the oxidation state of M, with the proviso that if k is greater than 1, each Q may be the same or different. One noted example is isoprenyl fluorenyl cyclopentadienyl zirconium dichloride. Such metallocene compounds are described in EP 0 426 646, which is fully incorporated herein by reference.

In yet other embodiments of this invention, the metallocene compound is represented by the formula (III):

$$R^A(CpR''_p)(CpR^*_q)M^5 Q_r \quad (III)$$

wherein:

each Cp is a cyclopentadienyl or substituted cyclopentadienyl ring;

each R* and R" is a hydrocarbyl group having from 1 to 20 carbon atoms and may be the same or different;

p is 0, 1, 2, 3, or 4;

q is 1, 2, 3, or 4;

$R^A$ is a structural bridge between the Cp rings imparting stereorigidity to the metallocene compound (preferably $R^A$ is selected from alkyl radicals having 1 to 4 carbon atoms or a hydrocarbyl radical comprising silicon, germanium, phosphorous, nitrogen, boron, or aluminum; preferably $R^A$ is silicon or an alkyl radical having 1 to 4 carbon atoms, alternately $R^A$ is as defined for $R^{13}$ above);

$M^5$ is a group 4, 5, or 6 metal (preferably titanium, zirconium, or hafnium);

Q is a hydrocarbyl radical having 1 to 20 carbon atoms or is a halogen, alternately Q is as defined for $R^1$ above;

r is s–2, where s is the valence of $M^5$; and wherein $(CpR^*_q)$ has bilateral or pseudobilateral symmetry; $R^*_q$ is selected such that $(CpR^*_q)$ forms a fluorenyl, alkyl substituted indenyl, or tetra-, tri-, or dialkyl substituted cyclopentadienyl radical; and $(CpR''_p)$ contains a bulky group in one and only one of the distal positions;

wherein the bulky group is of the formula $AR^w_v$;

where A is chosen from group 4 metals, oxygen, or nitrogen (preferably A is carbon or silicon, preferably carbon), and $R^w$ is a methyl radical or phenyl radical (preferably methyl), and v is the valence of A minus 1. "Bilateral symmetry" is defined as the condition in which there are no substituents or one or more substituents on one side and no substituents or one or more substituents on the other side, such that a mirror image is formed from one side to the other. One example of a bilaterally symmetrical metallocene useful herein is isopropyl(3-t-butyl cylopentadienyl-1-fluorenyl)zirconium dichloride, having the right side of the fluorenyl ligand being a mirror image of the left side. "Pseudobilateral symmetry" is defined as symmetry such that a mirror image exists from one side to the other in regard to the existence and position of substituents, but the substituents themselves are not identical. Such metallocene compounds are further described in U.S. Pat. No. 5,416,228, which is fully incorporated herein by reference.

In even other embodiments of this invention, the metallocene compound is represented by the formula (IV):

$$R^A(CpR''_p)(CpR^*_q)M^5Q_r \quad (IV);$$

wherein:
each Cp is a cyclopentadienyl or substituted cyclopentadienyl ring;
each R* and R" is a hydrocarbyl group having from 1 to 20 carbon atoms and may be the same or different (preferably hydrocarbyl groups include methyl, ethyl, propyl, isopropyl, butyl, isobutyl, amyl, isoamyl, hexyyl, octyl, nonyl, decyl, cetyl, and phenyl), and may comprise hydrocarbyl radicals attached to a single carbon in the Cp ring, as well as radicals that are bonded to two carbon atoms in the ring;
p is 0, 1, 2, 3, or 4;
q is 1, 2, 3, or 4;
$R^A$ is a structural bridge between the Cp rings imparting stereorigidity to the metallocene compound (preferably $R^A$ is selected from alkyl radicals having 1 to 4 carbon atoms or a hydrocarbyl radical comprising silicon, germanium, phosphorous, nitrogen, boron, or aluminum, alternately $R^A$ is as defined for $R^{13}$ above);
$M^5$ is a group 4, 5, or 6 metal (preferably titanium, zirconium, or hafnium);
Q is a hydrocarbyl radical having 1 to 20 carbon atoms or is a halogen (preferably a halogen; preferably chlorine, alternately Q is as defined for $R^1$ above); and
r is 0, 1, 2, or 3 (preferably 2); and
wherein R*q is selected such that $(CpR^*_q)$ is a sterically different ring than $(CpR''_p)$. "Steric difference" or "sterically different ring" implies a difference between the steric characteristics of the Cp rings that controls the approach of each successive monomer that is added to the polymer chain. Such metallocene compounds are described in U.S. Pat. No. 4,892,851, which is fully incorporated herein by reference.

Monomers

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment, the monomers used in the first step, i.e. ethylene polymerization, comprise ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. Likewise, the monomers useful in the second step, i.e. propylene polymerization, comprise propylene and an optional comonomers comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In an alternate embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably the second polymerization, preferably 400 ppm or less, preferably or 300 ppm or less. In other embodiments at least 50 ppm of diene is added to the polymerization, preferably the second polymerization, or 100 ppm or more, or 150 ppm or more. Preferred dienes are selected from alpha, omega-diene monomers containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene. In preferred embodiments, the monomers comprise 0 wt % diene monomer in any stage, preferably in all stages.

Preferably, the first polymerization or copolymerization is carried out using ethylene and optionally, comonomer of propylene, butene, hexene, and/or octene. Preferably, the second polymerization or copolymerization is carried out using propylene and optional comonomer of ethylene, butene, pentene, hexene, octene, nonene, decene, and/or dodcene.

In embodiments of the invention, the comonomer(s), e.g., the C3+ monomers, are present in the final polymer composition at less than 50 mol %, preferably from 0.5 to 45 mol %, preferably from 1 to 40 mol %, preferably from 3 to 35 mol %, preferably from 5 to 35 mol %, preferably from 7 to 30 mol %, with the balance of the copolymer being made up of the main monomer (e.g., ethylene).

In embodiments of the invention, in the final polymer composition, the ethylene is present at 30 to 99 mol %, preferably 50 mol %, preferably 30 mol %, the propylene is present at 1 to 50 mol %, preferably 40 mol %, preferably 30 mol %, and any optional comonomers are present at 0 to 35 mol %, preferably from 0.5 to 30 mol %, preferably from 1 to 20 mol %, preferably from 3 to 10 mol %.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and provide a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. No. 5,153,157; U.S. Pat. No. 5,198,401; U.S. Pat. No. 5,066,741; U.S. Pat. No. 5,206,197; U.S. Pat. No. 5,241,025; U.S. Pat. No. 5,384,299; U.S. Pat. No. 5,502,124; and U.S. Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277 003 A1 and EP 0 277 004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (1):

$$(Z)_d^+(A^{d-}) \qquad (1)$$

wherein Z is (L-H) or a reducible Lewis Acid, L is an neutral Lewis base; H is hydrogen; (L-H)+ is a Bronsted acid; $A^{d-}$ is a non-coordinating anion having the charge d−; and d is an integer from 1 to 3.

When Z is (L-H) such that the cation component is (L-H)$_{d+}$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_{d+}$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: $(Ph_3C+)$, where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component Ad– includes those having the formula $[Mk+Q_n]d-$ wherein k is 1, 2, or 3; n is 1, 2, 3, 4, 5, or 6, preferably 3, 4, 5 or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable Ad– components also include diboron compounds as disclosed in U.S. Pat. No. 5,447,895, which is fully incorporated herein by reference.

NCA activators represented by the formula (3) may also be used herein:

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 3 also comprises a suitable cation that is essentially non-interfering with the ionic catalyst complexes formed with the transition metal compounds, preferably the cation is $Z_d+$ as described above.

In a preferred embodiment in any of the NCA's comprising an anion represented by Formula 3 described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; $-SR^1$, $-NR^2_2$, and $-PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

In a preferred embodiment in any of the NCA's comprising an anion represented by Formula 3 described above, the NCA also comprises cation comprising a reducible Lewis acid represented by the formula: $(Ar_3C+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid represented by the formula: $(Ph_3C+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's comprising an anion represented by Formula 3 described above, the NCA also comprises a cation represented by the formula, $(L-H)_d+$, wherein L is an neutral Lewis base; H is hydrogen; (L-H) is a Bronsted acid; and d is 1, 2, or 3, preferably $(L-H)_d+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (4):

wherein $OX^{e+}$ is a cationic oxidizing agent having a charge of e+; e is 1, 2, or 3; d is 1, 2 or 3; and $A^{d-}$ is a non-coordinating anion having the charge of d– (as further described above). Examples of cationic oxidizing agents include ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, amidinate catalyst compounds described herein can be used with Bulky activators. A "Bulky activator" as used herein refers to anionic activators represented by the formula:

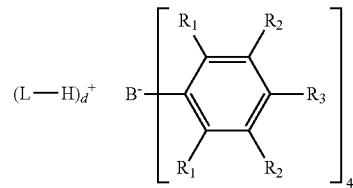

where:
each $R_1$ is, independently, a halide, preferably a fluoride;
each $R_2$ is, independently, a halide, a $C_6$ to $C_{20}$ substituted aromatic hydrocarbyl group or a siloxy group of the formula $-O-Si-R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula $-O-Si-Ra$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | MV Per substituent (Å$^3$) | Total MV (Å$^3$) |
|---|---|---|
| Dimethylanilinium tetrakis(perfluoronaphthyl)borate | 261 | 1044 |
| Dimethylanilinium tetrakis(perfluorobiphenyl)borate | 349 | 1396 |
| [4-tButyl-PhNMe$_2$H] [(C$_6$F$_3$(C$_6$F$_5$)$_2$)$_4$B] | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

Illustrative, but not limiting, examples of boron compounds which may be used as an activator in the processes of this invention include N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis (3,5-bis(trifluoromethyl)phenyl)borate, triphenylcarbenium tetrakis(perfluorophenyl)borate, [Ph$_3$C+][B(C$_6$F$_5$)$_4$—], [Me$_3$NH+][B(C$_6$F$_5$)$_4$—]; 1-(4-(tris(pentafluorophenyl)borate)-2,3,5,6-tetrafluorophenyl)pyrrolidinium; and tetrakis (pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium)tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium)tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In a particularly preferred embodiment, the activator used in combination with any catalyst compound(s) described herein is N,N-dimethylanilinium tetrakis(perfluoronaphthyl)borate.

In a preferred embodiment, any of the activators described herein may be mixed together before or after combination with the catalyst compound, preferably before being mixed with the catalyst compound.

In some embodiments two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. No. 5,153,157, U.S. Pat. No. 5,453,410, EP 0 573 120 B1, WO 94/07928, and WO 95/14044 which discuss the use of an alumoxane in combination with an ionizing activator).

Optional Scavengers or Co-Activators

In addition to the activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used.

Support Materials

In embodiments herein, the catalyst system may comprise an inert support material. Preferably the supported material is a porous support material, for example, talc, and inorganic oxides. Other support materials include zeolites, clays, organoclays (including ion-exchange layered silicates), or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2$/g, pore volume in the range of from about 0.1 to about 4.0 cc/g and average particle size in the range of from about 5 to about 500 μm. More preferably, the surface area of the support material is in the range of from about 50 to about 500 $m^2$/g, pore volume of from about 0.5 to about 3.5 cc/g and average particle size of from about 10 to about 200 μm. Most preferably the surface area of the support material is in the range is from about 100 to about 400 $m^2$/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Preferred silicas are marketed under the tradenames of DAVISON 952 or DAVISON 955 by the Davison Chemical Division of W.R. Grace and Company. In other embodiments DAVISON 948 is used.

Process Conditions

This invention relates to a process for producing ethylene-propylene-based in-reactor compositions comprising: (a) contacting ethylene and from about 0 wt % to 10 wt % $C_3$ to $C_{20}$ alpha olefins in the presence of a metallocene catalyst system in a first stage to form Component A; (b) contacting Component A, from about 3 wt % to 30 wt % of propylene and, optionally one or more of ethylene, or $C_4$ to $C_{20}$ alpha olefins, in the presence of the metallocene catalyst system, under polymerization conditions in a second stage to form Component B; wherein the metallocene catalyst system is preferably the same in the first and second stages and comprises: (i) a metallocene compound comprising a group 4, 5, or 6 metal, (ii) an activator, and (iii) an optional support material; and (c) obtaining an ethylene-propylene-based in-reactor composition comprising Component A and Component B, wherein the ethylene-propylene-based in-reactor composition has a multimodal melting point, optionally, an elongation at break of greater than 100%. Elongation at break is determined according to ASTM D 638 (Type I bar, 5 cm/min).

The in-reactor compositions of this invention may be prepared by conventional polymerization processes such as a two-step process, although it is also possible to produce these in-reactor compositions in a single reactor. Each stage may be independently carried out in either the gas, solution or liquid slurry phase. For example, the first stage may be conducted in the gas phase and the second in liquid slurry or vice versa. Alternatively, each phase may be the same. Preferably, the in-reactor compositions of this invention are produced in multiple reactors, preferably two or three, operated in series, Component A is preferably polymerized first, in a gas phase, liquid slurry or solution polymerization process. Component B is preferably polymerized in a second, gas phase reactor.

As used herein "stage" is defined as that portion of a polymerization process during which one component of the in-reactor composition, Component A or Component B, is produced. One or multiple reactors may be used during each stage.

The stages of the polymerization processes of this invention can be carried out in any manner known in the art, in solution, in suspension or in the gas phase, continuously or batchwise, or any combination thereof, in one or more steps. Homogeneous polymerization processes are useful. (A homogeneous polymerization process is defined to be a process where at least 90 wt % of the product is soluble in the reaction media.) A bulk homogeneous process is particularly useful. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and at least 95 wt % of polymer products derived from the supported catalyst are in granular form as solid particles (not dissolved in the diluent). Gas phase processes are particularly preferred.

If the polymerization is carried out as a suspension or solution polymerization, an inert solvent may be used, for example, the polymerization may be carried out in suitable diluents/solvents. Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents. It is also possible to use mineral spirit or a hydrogenated diesel oil fraction as a solvent. Toluene may also be used. The polymerization is preferably carried out in the liquid monomer(s). If inert solvents are used, the monomer(s) is (are) metered in gas or liquid form.

In a preferred embodiment, the feed concentration of the monomers and comonomers for the polymerization is 60 vol % solvent or less, preferably 40 vol % or less, or preferably 20 vol % or less, based on the total volume of the feedstream. Preferably, the polymerization is run in a bulk process.

Preferred polymerizations can be run at any temperature and/or pressure suitable to obtain the desired polymers. Typical temperatures and/or pressures for each stage include a temperature greater than 30° C., preferably greater than 50° C., preferably greater than 65° C., alternately less than 200° C., preferably less than 150° C., most preferred less than 140° C.; and at a pressure in each stage in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes, where each stage may be longer or shorter than the other stage and there may be a time period between stages.

Hydrogen may be added to one or both stages to control molecular weight and MFR (ASTM 1238, 2.16 kg and 190° C. for ethylene polymers and 260° C. for propylene polymers). The overall pressure in either or both stages of the polymerization system usually is at least about 0.5 bar, preferably at least about 2 bar, most preferred at least about 5 bar. Pressures higher than about 100 bar, e.g., higher than about 80 bar and, in particular, higher than about 64 bar are usually not preferred. In some embodiments, hydrogen is present in the polymerization stage(s) at a partial pressure of from 0.001 to 100 psig (0.007 to 690 kPa), preferably from 0.001 to 50 psig (0.007 to 345 kPa), preferably from 0.01 to 25 psig (0.07 to 172 kPa), more preferably 0.1 to 10 psig (0.7 to 70 kPa).

Properties of In-Reactor Compositions

The in-reactor compositions of this invention have a multimodal melting point. The term "multimodal," when used to describe the melting point of a polymer or polymer composition is understood to mean that the Differential Scanning calorimetry (DSC) trace, plotted as heat flow (J/g) versus temperature (° C.), has more than one peak or inflection point. An "inflection point" is that point where the second derivative of the curve changes in sign (e.g., from negative to positive or vice versa). For example, an in-reactor composition that has two melting points (first melt) of 126.61° C. and 160.29° C. is considered to have a "bimodal" melting point, which is a multimodal melting point.

The in-reactor compositions preferably have a multimodal melting point (preferably two melting points or more, preferably three melting points or more, most preferably two melting points). The first melting point is preferably from about 115° C. to about 130° C., preferably from about 115 to about 125° C., preferably from about 118° C. to about 123° C. The second melting point is preferably from about 140° C. to about 165° C., preferably from about 142° C. to about 160° C., preferably from about 145° C. to about 160° C., preferably from about 148° C. to about 160° C. In a preferred embodiment, two of the melting points differ by at least 10° C., preferably by at least 20° C., preferably by at least 25° C., preferably by at least 30° C., preferably by at least 35° C.

The in-reactor compositions preferably have a multimodal melting point, where at least one melting point is 140° C. or more, preferably from about 140° C. to about 165° C., preferably from about 142° C. to about 160° C., preferably from about 145° C. to about 160° C., preferably from about 148° C. to about 160° C. In a preferred embodiment, two of the melting points differ by at least 10° C., preferably by at least 20° C., preferably by at least 25° C., preferably by at least 30° C., preferably by at least 35° C.

Melting points ($T_m$) are measured using Differential Scanning calorimetry (DSC), according to the method described in the Test Methods section below.

The in-reactor compositions of this invention also have a multimodal heat of fusion, each heat of fusion corresponding to a melting point. Preferably, at least one heat of fusion is 2 J/g or greater, preferably 5 J/g or greater, preferably 10 J/g or greater, preferably 15 J/g or greater, and preferably 20 J/g or greater; alternately 30 J/g or less, 25 J/g or less, 20 J/g or less, or 15 J/g or less. Preferably, at least one other melting point is 30 J/g or greater, preferably 50 J/g or greater, preferably 75 J/g or greater, preferably 90 J/g or greater, alternately 80 J/g or less, 60 J/g or less, or 40 J/g or less. In a preferred embodiment, two of the heats of fusion differ by at least 10 J/g, preferably by at least 20 J/g, preferably by at least 25 J/g, preferably by at least 30 J/g, preferably by at least 35 J/g, preferably by at least 40 J/g. In another embodiment two of the heats of fusion differ by 10 to 70 J/g, preferably by 15 to 60 J/g, preferably 20 to 50 J/g. Heat of fusion is measured using Differential Scanning calorimetry (DSC), according to the method described in the Test Methods section below.

The in-reactor compositions of this invention are in the form of free-flowing, discrete particles. Preferably, the free-flowing discrete particles of the in-reactor compositions of the present invention may be regarded as a pourable free-flowing polymer. As such, the particles of the present invention are not tacky or sticky, and thus do not block, which is to say the particles do not stick to one another nor to other surfaces so as to form agglomerates comprising a plurality of pellets to an extent which prevents the pellets from being pourable.

By "pourable free-flowing" it is meant that the particles will flow through a funnel and yield a pourability value according to ASTM D1895 Method B modified to use a funnel having a 29 mm bottom opening, preferably both initially and after elevated temperature storage (e.g., storage at 120° F. for 7 days). Accordingly, the particles of the present invention are pourable free-flowing in that they may be poured through a funnel having a 2.9 cm opening at the narrow end.

An initial pourability value (i.e., prior to aging or storage) of the particles of the present invention is about 120 seconds or less, when determined according to ASTM D1895 Method B modified to use a funnel having a 29 mm bottom opening. Preferably, the pourability value is about 60 seconds or less, more preferably about 30 seconds or less, still more preferably about 10 seconds or less, more preferably about 5 seconds or less, still more preferably about 2 seconds or less, when determined according to ASTM D1895 Method B modified to use a funnel having a 29 mm bottom opening. Accordingly, the polymer of the present invention is preferably pelletized into a plurality of pourable free flowing particles that may be poured through a funnel having a 29 mm bottom opening. In a preferred embodiment, the plurality of pourable free flowing particles of the polymer (whether pellet or neat particle directly from the reactor) can be poured through a funnel having a 29 mm bottom opening in 120 seconds or less, preferably in 60 seconds or less, more preferably in 30 seconds or less, more preferably in 20 seconds or less. In a particularly preferred embodiment, after storage at 120° C. for 7 days, the plurality of pourable free flowing particles of the polymer (whether pellet or neat particle directly from the reactor) can be poured through a funnel having a 29 mm bottom opening in 120 seconds or less, preferably in 60 seconds or less, more preferably in 30 seconds or less, more preferably in 20 seconds or less.

Properties of these ethylene-propylene-based in-reactor compositions may include a melt flow rate (ASTM 1238, 230° C., 2.16 kg) of from about 0.85 to about 50 g/10 min; and/or a tensile strength at yield in the range of from 2000 to about 5000 psi; and/or a 1% secant flexural modulus at a crosshead speed of 50.8 mm/min in the range of from about 150 to about 250 kpsi.

The ethylene-propylene-based in-reactor composition preferably has a melt flow rate ("MFR") at 230° C. and 2.16 kg load in the range of from about 0.85 to about 50 g/10 min preferably from about 1.0 to about 45 g/10 min, (preferably from about 2 to about 40 g/10 min, or preferably from about 5 to about 35 g/10 min). MFR is measured as per ASTM D1238, condition L, at 230° C. and 2.16 kg load using a melt indexer.

The ethylene-propylene-based in-reactor composition preferably has a tensile strength at yield in the range of from 2000 to about 5000 psi (preferably from about 2500 to about 5000 psi, preferably 2750 to 4500 psi, preferably from about 3000 to about 4500 psi). Tensile strength at yield is measured as per ASTM D638, with a crosshead speed of 50.8 mm/min (2.0 in/min), and a gauge length of 50.8 mm (2.0 in), using an INSTRON™ machine.

The ethylene-propylene-based in-reactor composition preferably has a 1% secant flexural modulus at a crosshead speed of 50.8 mm/min in the range of from about 150 to about 250 kpsi (preferably from about 175 to about 250 kpsi, preferably from 175 to about 225 kpsi, preferably from about 200 to about 225 kpsi). The flexural modulus was measured according to ASTM D790A, using a crosshead speed of 1.27 mm/min (0.05 in/min), and a support span of 50.8 mm (2.0 in) using an INSTRON™ machine.

The ethylene-propylene-based in-reactor composition preferably has a notched izod impact strength at 21° C. in the range of from about 0.5 to 8 ft·lbs/in (preferably from about 0.5 to about 7.0 ft·lbs/in, preferably from about 1.0 to about 6.5 ft·lbs/in, preferably from about 2.0 to about 6.0 ft·lbs/in). The Notched Izod impact strength was measured as per ASTM D256 at room temperature (21° C.), using equipment made by Empire Technologies Inc.

The ethylene-propylene-based in-reactor composition preferably has an elongation at break of greater than 100%, preferably greater than 150%, preferably greater than 200%, preferably greater than 250% preferably greater than 300%, preferably greater than 350% preferably greater than 400%. The elongation at break was measured as per ASTM D 638.

The ethylene-propylene-based in-reactor composition preferably has a Heat Deflection Temperature (HDT) of 90° C. or more, preferably 95° C. or more, preferably 100° C. or more as measured by ASTM D 648 (66 psi).

In any embodiment of the invention, the ethylene-propylene-based in-reactor composition has 1 to 200 regio defects, (defined as the sum of 2,1-erythro and 2,1-threo insertions, and 3,1-isomerizations) per 10,000 propylene unites, alternatively more than 15 and less than 200 regio defects per 10,000 propylene unites, alternatively more than 5 and less than 175 regio defects per 10,000 propylene units, alternatively more than 10 or 20 or 30, but less than 200 regio defects, alternatively less than 150 regio defects per 10,000 propylene units. The regio defects are determined using $^{13}$C NMR spectroscopy as described below.

In another embodiment, the ethylene-propylene-based in-reactor composition comprises 10 mol % or more propylene (preferably 14 to 99 mol %, preferably 20 to 99 mol %, preferably 25 to 95 mol %, preferably 30 to 90 mol %, preferably 35 to 80 mol % as determined by $^{13}$CNMR) and has 1 to 200 regio defects, (defined as the sum of 2,1-erythro and 2,1-threo insertions, and 3,1-isomerizations) per 10,000 propylene units, alternately 5 to 200 regio defects per 10,000 propylene units, alternately 8 to 200 regio defects per 10,000 propylene units, alternately 10 to 175 regio defects per 10,000 propylene units, alternatively more than 10 or 20 or 30, but less than 200 regio defects, alternatively less than 150 regio defects per 10,000 propylene units. The regio defects are determined using $^{13}$C NMR spectroscopy as described below.

In embodiments of the invention, in the ethylene-propylene-based in-reactor composition:

1) the ethylene is present at 20 to 85 mol %, preferably 25 to 85 mol %, preferably 30 to 80 mol %, preferably 30 to 70 mol %;

2) the propylene is present at 15 to 80 mol %, preferably 15 to 75 mol %, preferably 20 to 70 mol %, preferably 30 to 70 mol %, and 3) any optional comonomers are present at 0 to 35 mol %, preferably from 0.5 to 30 mol %, preferably from 1 to 20 mol %, preferably from 3 to 10 mol %.

In any embodiment of the invention, the ethylene-propylene-based in-reactor composition has an average meso run length of 35 or more, alternately 40 or more, preferably from 35 to 500, preferably 40 to 200, preferably 40 to 100. Average meso run length is determined by dividing 10,000 by the regio defects (defined as the sum of 2,1-erythro and 2,1-threo insertions, and 3,1-isomerizations) plus stereo defects (defined as ½(mmrr+mmrm+rmrm)*10,000).

The in-reactor compositions of this invention are "reactor produced" meaning Components A and B are not physically or mechanically blended together. Rather, they are interpolymerized in at least one reactor.

Component A

Component A preferably comprises 70 wt % to 97 wt % ethylene derived units and 0 wt % to 30 wt % $C_3$ to $C_{20}$ alpha olefin derived units, based on the weight of Component A. Component A is most preferably a copolymer consisting essentially of ethylene and propylene, butene, hexene and or octene, although other ethylene copolymers or terpolymers may be suitable depending on the particular product properties desired. For example, ethylene/butene, ethylene/hexene, or ethylene/octene copolymers, and ethylene/propylene/hexene-1 terpolymers may be used. In a preferred embodiment, Component A is a copolymer comprising 70 wt % to 97 wt % ethylene derived units, more preferably from about 80 wt % to 97 wt % ethylene derived units, even more preferably from about 80 wt % to 95 wt % ethylene derived units. The comonomer content of Component A is preferably in the range of from about 3% to about 30% by weight comonomer, more preferably from about 5% to about 30% by weight comonomer, even more preferably from about 5% to about 20% by weight comonomer. Preferred comonomers are propylene, butene, pentene, hexene, octene, and decene. Preferably, Component A is selected from the group consisting of ethylene-propylene, ethylene-butene, ethylene-hexene, ethylene-octene, and ethylene-decene copolymers (alternately Component A is a terpolymer selected from the group consisting of: ethylene-butene-propylene, ethylene-hexene-propylene, ethylene-octene-propylene, and ethylene-decene-propylene). Most preferably, Component A consists essentially of ethylene and from about 3% to about 30% by weight propylene, more preferably from about 5% to about 30% by weight propylene, even more preferably from about 5% to about 20% by weight propylene.

For other Component A copolymers, the comonomer contents may need to be adjusted depending on the specific properties desired. For example, for ethylene-hexene copolymers, Component A may contain at least 17% by weight hexene and at least 83% by weight ethylene.

Component A preferably has a narrow MWD (Mw/Mn), preferably 3.5 or less, preferably 3.0 or less, more preferably 2.5 or less, and most preferably 2.25 or less. These molecular weight distributions should be obtained in the absence of visbreaking or peroxide or other post reactor treatment designed to reduce molecular weight. Component A preferably has a weight average molecular weight (Mw as determined by GPC) of at least 50,000 g/mol, preferably at least 150,000 g/mol, and most preferably at least 200,000 g/mol, or alternately less than 1,000,000 g/mol, less than 650,000 g/mol, less than 500,000 g/mol, or less than 300,000 g/mol.

Component A preferably has high crystallinity, preferably greater than 60% by weight of a crystalline portion, more preferably greater than 85% by weight of a crystalline portion, as determined by DSC described in the Test Methods section below.

Component B

As used herein component B refers to the propylene polymer produced in the second stage as opposed to the total composition of the in-reactor blend product.

Component B preferably comprises 90 wt % to 100 wt % propylene derived units and 0 wt % to 10 wt % $C_2$ and/or $C_4$ to $C_{20}$ alpha olefin derived units, based on the weight of Component B. Component B is preferably an isotactic propylene homopolymer (preferably comprising 0 wt % $C_2$ and/or $C_4$ to $C_{20}$ alpha olefin derived units). In some embodiments, small amounts of a comonomer may be used to obtain particular properties. In such embodiments, Component B comprises from about 0.5% to 10% by weight, preferably from about 1% to 6% by weight or less of $C_2$ and/or $C_4$ to $C_{20}$ alpha olefin derived units (preferably comonomers such as ethylene, butene, hexene, or octene, most preferably, less than 4% by weight ethylene is used). The end result is usually a copolymer Component B having lower stiffness but with some gain in impact strength compared to a homopolymer Component B.

Component B preferably has a narrow molecular weight distribution (Mw/Mn), preferably 3.5 or less, preferably 3.0 or less, preferably 2.5 or less, and preferably 2.25 or less. These molecular weight distributions are obtained in the absence of visbreaking using peroxide or other post reactor treatment designed to reduce molecular weight. Component B preferably has a weight average molecular weight (Mw as determined by Gel Permeation Chromatography (GPC)) of at least 50,000 g/mol, preferably at least 100,000 g/mol, more preferably at least 200,000 g/mol, and alternately less than 300,000 g/mol, preferably less than 250,000 g/mol, most preferably less than 200,000 g/mol. Unless otherwise indicated, Mw, Mn, and MWD are determined by GPC as described in US 2006/0173123 pp. 24-25, paragraphs [0334] to [0341].

In a preferred embodiment, Component B has a unimodal or multimodal molecular weight distribution as determined by GPC. By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In a preferred embodiment, Component B is characterized as having low amorphous polypropylene content, preferably less than 3% by weight (based upon the weight of Component B), more preferably less than 2% by weight, even more preferably less than 1% by weight and most preferably there is no measurable amorphous polypropylene. This can be ascertained by extracting atactic polypropylene with boiling heptane.

In a preferred embodiment, Component B is characterized as having isotactic polypropylene content. Therefore, the polymerization catalyst is selected such that isotactic polypropylene is produced in the second stage of the in-reactor process.

In any embodiment of the invention, when the Component B is a propylene polymer, the propylene polymer (the B component) advantageously has more than 15 and less than 200 regio defects (defined as the sum of 2,1-erythro and 2,1-threo insertions, and 3,1-isomerizations) per 10,000 propylene units, alternatively more than 17 and less than 175 regio defects per 10,000 propylene units, alternatively more than 20 or 30 or 40, but less than 200 regio defects, alternatively less than 150 regio defects per 10,000 propylene units. The regio defects are determined using $^{13}C$ NMR spectroscopy as described below.

In any embodiment of the invention, when the Component B is a propylene polymer, the propylene polymer (the B component) advantageously has 1 to 200 regio defects, (defined as the sum of 2,1-erythro and 2,1-threo insertions, and 3,1-isomerizations) per 10,000 propylene units, alternately more than 5 and less than 200 regio defects per 10,000 propylene unites, alternatively more than 8 and less than 175 regio defects per 10,000 propylene units, alternatively more than 10 or 20 or 30, but less than 200 regio defects, alternatively less than 150 regio defects per 10,000 propylene units. The regio defects are determined using $^{13}C$ NMR spectroscopy as described below.

In any embodiment of the invention, when the Component B is a propylene polymer, the propylene polymer (the B component) advantageously has an average meso run length of 35 or more, alternately 40 or more, preferably from 35 to 500, preferably 40 to 200, preferably 40 to 100. Average meso run length is determined by dividing 10,000 by the regio defects (defined as the sum of 2,1-erythro and 2,1-threo insertions, and 3,1-isomerizations) plus stereo defects (defined as ½(mmrr+mmrm+rmrm)*10,000).

End Uses

The in-reactor compositions of this invention are "reactor produced" meaning Components A and B are not physically or mechanically blended together. Rather, they are interpolymerized in at least one reactor. The final in-reactor compositions as obtained from the reactor or reactors, however, can be blended with various other components including other polymers. A variety of additives may be incorporated into the in-reactor compositions for various purposes. Such additives include, for example, stabilizers, antioxidants, fillers, colorants, nucleating agents and mold release agents.

The in-reactor compositions of this invention described herein find uses in all applications including fibers, injection molded parts, films, pipes, and wire and cable applications. Examples include carpet fibers and primary and secondary carpet backing; slit tape applications such as tarpaulins, erosion abatement screens, sand bags, fertilizer and feed bags, swimming pool covers, intermediate bulk container (IBC) bags; non-woven applications for spun-bonded, melt blown and thermobonded fibers; carded web applications such as disposable diaper liners, feminine hygiene products, tarpaulins and tent fabrics, and hospital garments; apparel applications such as socks, t-shirts, undergarments, bicycle shorts, sweat bands, football undershirts, hiking socks and other outdoor sporting apparel; cordage applications such as mooring and towing lines and rope; netting applications such as safety fences, geogrids for soil stabilization; injection molded applications such as appliance parts in automatic dishwashers and clothes washers, hand tools and kitchen appliances; consumer product applications such as outdoor furniture, luggage, infant car seats, ice coolers, yard equipment; medical applications such as disposable syringes and other hospital and laboratory devices; rigid packaging made by injection molding, blow molding or thermoforming such as margarine tubs, yogurt containers and closures, commercial bottles and ready-to-eat food containers; transportation applications such as automotive interior trim, instrument panels, bumper fascia, grills and external trim parts, battery cases; film applications such as snack packages and other food packaging and film labels, packing tapes and pressure sensitive labels; wire and cable applications such as wire insulation.

The in-reactor compositions of this invention described herein may be used by themselves or blended with one or more additional polymers. In another embodiment, the in-reactor compositions of this invention produced herein is combined with one or more additional polymers prior to being formed into a film, molded part or other article. Useful additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE (low density polyethylene), LLDPE (linear low density polyethylene), HDPE (high density polyethylene), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM (ethylene-propylene-diene monomer rubber), block copolymer, styrenic block copolymers, polyamides, polycarbonates, PET (polyethylene terephthalate) resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the in-reactor compositions of this invention is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The in-reactor compositions of this invention may be combined with additives known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

In particular embodiments, the in-reactor compositions of this invention or blends thereof that may be used in film applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Molded Products

The in-reactor compositions of this invention or blends thereof described herein may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the in-reactor compositions of this invention or blends thereof may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or alternatively by calendaring. Sheets are generally considered to have a thickness of from 10 mils to 100 mils (254 µm to 2540 µm), although any given sheet may be substantially thicker.

Non-Wovens and Fibers

The in-reactor compositions of this invention or blends thereof described above may also be used to prepare non-woven fabrics and fibers of this invention in any nonwoven fabric and fiber making process, including but not limited to, melt blowing, spunbonding, film aperturing, and staple fiber carding. A continuous filament process may also be used. Preferably, a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

In a useful embodiment, the compositions herein are formed into molded parts.

In another embodiment, this invention relates to:

1. A process for producing ethylene-based in-reactor compositions comprising:

1) contacting ethylene and optionally a $C_2$ to a $C_{12}$ alpha-olefin comonomer under polymerization conditions in a first stage in the presence of a first metallocene catalyst system to form Component A;

2) contacting Component A of step (a) with a $C_3$ to a $C_{12}$ alpha-olefin monomer under polymerization conditions in a second stage in the presence of a second metallocene catalyst system to form Component B, wherein the first metallocene catalyst system is present in both steps a and b and/or additional metallocene catalyst is added to the reaction mixture between steps a and b and the first metallocene catalyst system may be the same as the second metallocene catalyst system; and 3) obtaining an ethylene-based in-reactor composition comprising Component A and Component B, wherein the ethylene-based in-reactor composition has from greater than 20% (preferably 30%) to about 85% of ethylene on a mole percentage and wherein the polymer composition has a multimodal melting point.

2. The process of paragraph 1, wherein Component A is produced by the first metallocene catalyst system which may be the same as or different from the second metallocene catalyst system, wherein each metallocene catalyst system independently comprises: (i) a metallocene compound comprising a group 4, 5, or 6 metal; (ii) an activator; and (iii) a support material.

3. The process of paragraph 2, wherein the first metallocene catalyst system is the same as the second metallocene catalyst system.

4. The process of paragraph 2 or 3, wherein the process comprises 0 wt % diene monomer.

5. The process of paragraph 1, 2, 3 or 4, wherein each metallocene catalyst system, independently, comprises a metallocene compound represented by the following formula:

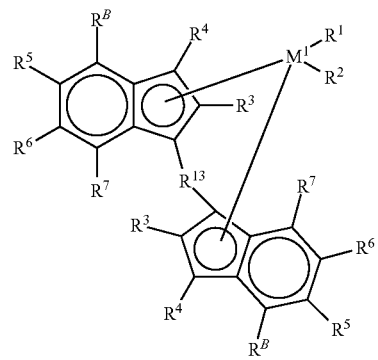

wherein:

$M^1$ is selected from titanium, zirconium, hafnium, vanadium, niobium, tantalum, chromium, molybdenum and tungsten; $R^1$ and $R^2$ are selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; optionally $R^1$ and $R^2$ are joined together to form a $C_4$ to $C_{40}$ alkanediyl group or a conjugated $C_4$ to $C_{40}$ diene ligand which is coordinated to $M^1$ in a metallacyclopentene fashion; optionally $R^1$ and $R^2$ represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a π complex with $M^1$; each $R^3$ and $R^B$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —$NR'_2$, —$SR'$, —$OR'$, —$SiR'_3$, —$OSiR'_3$, and —$PR'_2$ radicals wherein each R' is independently selected from halogen, substituted or unsubstituted $C_1$ to $C_{10}$ alkyl groups and substituted or unsubstituted $C_6$ to $C_{14}$ aryl groups; $R^4$, $R^5$, $R^6$, and $R^7$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and $C_7$ to $C_{40}$ substituted or unsubstituted arylalkenyl groups; and $R^{13}$ is selected from:

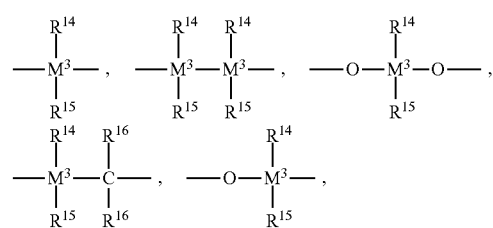

-continued

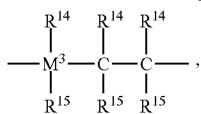

—B(R$^{14}$)—, —Al(R$^{14}$)—, —Ge—, —Sn—, —O—, —S—, —SO—, —SO$_2$—, —N(R$^{14}$)—, —CO—, —P(R$^{14}$)—, and —P(O)(R$^{14}$)—;

wherein R$^{14}$, R$^{15}$, and R$^{16}$ are each independently selected from hydrogen, halogen, C$_1$ to C$_{20}$ alkyl groups, C$_6$ to C$_{30}$ aryl groups, C$_1$ to C$_{20}$ alkoxy groups, C$_2$ to C$_{20}$ alkenyl groups, C$_7$ to C$_{40}$ arylalkyl groups, C$_8$ to C$_{40}$ arylalkenyl groups and C$_7$ to C$_{40}$ alkylaryl groups, optionally R$^{14}$ and R$^{15}$, together with the atom(s) connecting them, form a ring; and M$^3$ is selected from carbon, silicon, germanium, and tin; or R$^{13}$ is represented by the formula:

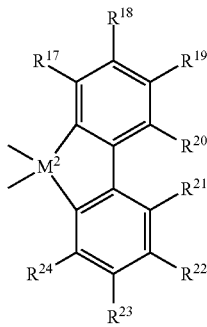

wherein R$^{17}$, R$^{18}$, R$^{19}$, R$^{20}$, R$^{21}$, R$^{22}$, R$^{23}$, and R$^{24}$ are each independently selected from hydrogen, halogen, hydroxy, substituted or unsubstituted C$_1$ to C$_{10}$ alkyl groups, substituted or unsubstituted C$_1$ to C$_{10}$ alkoxy groups, substituted or unsubstituted C$_6$ to C$_{14}$ aryl groups, substituted or unsubstituted C$_6$ to C$_{14}$ aryloxy groups, substituted or unsubstituted C$_2$ to C$_{10}$ alkenyl groups, substituted or unsubstituted C$_7$ to C$_{40}$ alkylaryl groups, substituted or unsubstituted C$_7$ to C$_{40}$ alkylaryl groups and substituted or unsubstituted C$_8$ to C$_{40}$ arylalkenyl groups; optionally two or more adjacent radicals R$^{17}$, R$^{18}$, R$^{19}$, R$^{20}$, R$^{21}$, R$^{22}$, R$^{23}$, and R$^{24}$, including R$^{20}$ and R$^{21}$, together with the atoms connecting them, form one or more rings; and M$^2$ represents one or more carbon atoms, or a silicon, germanium, or tin atom.

6. The process of paragraph 1, 2, 3 or 4, wherein each metallocene catalyst system, independently, comprises a metallocene compound represented by the following formula:

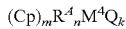

wherein each Cp is a cyclopentadienyl or a cyclopentadienyl substituted by one or more hydrocarbyl radical having from 1 to 20 carbon atoms; R$^A$ is a structural bridge between two Cp rings; M$^4$ is a transition metal selected from groups 4 or 5; Q is a hydride or a hydrocarbyl group having from 1 to 20 carbon atoms or an alkenyl group having from 2 to 20 carbon atoms, or a halogen; m is 1, 2, or 3, with the proviso that if m is 2 or 3, each Cp may be the same or different; n is 0 or 1, with the proviso that n=0 if m=1; and k is such that k+m is equal to the oxidation state of M, with the proviso that if k is greater than 1, each Q may be the same or different.

7. The process of paragraph 1, 2, 3 or 4, wherein each metallocene catalyst system, independently, comprises a metallocene compound represented by the formula:

wherein: each Cp is a cyclopentadienyl or substituted cyclopentadienyl ring;

each R* and R" is a hydrocarbyl group having from 1 to 20 carbon atoms and may the same or different; p is 0, 1, 2, 3, or 4; q is 1, 2, 3, or 4; R$^A$ is a structural bridge between the Cp rings imparting stereorigidity to the metallocene compound; M$^5$ is a group 4, 5, or 6 metal; Q is a hydrocarbyl radical having 1 to 20 carbon atoms or is a halogen;

r is s−2, where s is the valence of M$^5$; wherein (CpR*$_q$) has bilateral or pseudobilateral symmetry; R*$_q$ is selected such that (CpR*$_q$) forms a fluorenyl, alkyl substituted indenyl, or tetra-, tri-, or dialkyl substituted cyclopentadienyl radical; and (CpR"$_p$) contains a bulky group in one and only one of the distal positions; wherein the bulky group is of the formula AR$^w_v$; and where A is chosen from group 4 metals, oxygen, or nitrogen, and R$_w$ is a methyl radical or phenyl radical, and v is the valence of A minus 1.

8. The process of paragraph 1, 2, 3 or 4, wherein each metallocene catalyst system, independently, comprises a metallocene compound represented by the formula:

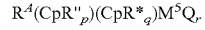

wherein: each Cp is a cyclopentadienyl or substituted cyclopentadienyl ring; each R* and R" is a hydrocarbyl group having from 1 to 20 carbon atoms and may be the same or different; p is 0, 1, 2, 3, or 4; q is 1, 2, 3, or 4; R$^A$ is a structural bridge between the Cp rings imparting stereorigidity to the metallocene compound; M$^5$ is a group 4, 5, or 6 metal; Q is a hydrocarbyl radical having 1 to 20 carbon atoms or is a halogen; r is 0, 1, 2, or 3; and wherein R*q is selected such that (CpR*$_q$) is a sterically different ring than (CpR"$_p$).

9. The process of any of paragraphs 1 to 8, wherein each metallocene catalyst system, independently, comprises an activator of an alumoxane and/or an ionic stoichiometric activator.

10. The process of paragraph 9, wherein the ionic stoichiometric activator is selected from the group consisting of: triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate.

11. The process of any of paragraphs 1 to 10, wherein each metallocene catalyst system, independently, comprises a support material selected from the group consisting of silica, alumina, silica aluminates and clay.

12. The process of any of paragraphs 1 to 11, wherein each metallocene catalyst system, independently, comprises a support material calcined to a temperature of from about 550° C. to about 650° C.

13. The process of any of paragraphs 1 to 12, wherein each metallocene catalyst system, independently, comprises a support material treated with an alkyl aluminum compound.

14. The process of paragraph 13, wherein the alkyl aluminum compound is one or more of trimethyl aluminum, triethyl aluminum, tri-n-octyl aluminum, tri-isobutyl aluminum, tri-n-hexyl aluminum, and dimethyl aluminum fluoride.

15. The process of any of paragraphs 1 to 14, further comprising adding trimethylaluminum, triethylaluminum, triisobutylaluminum, tri-n-octylaluminum, trihexylaluminum, and/or diethylzinc, in step (a).

16. The process of any of paragraphs 1 to 15, wherein both the first and second stages are carried out in the gas phase.

17. The process of any of paragraphs 1 to 16, wherein the polymerization conditions comprise a pressure of from about 965 kPa to about 5171 kPa and a temperature of from about 50° C. to 100° C.

18. The process of any of paragraphs 1 to 17, further comprising introducing Component A from step (a) into an intermediate stage, and depressurizing to less than 517 kPa, before step (b).

19. The process of any of paragraphs 1 to 18, wherein step (a) comprises 0 wt % $C_3$ and/or $C_4$ to $C_{20}$ alpha olefin, and Component A is an ethylene homopolymer.

20. The process of any of paragraphs 1 to 19, wherein Component B is selected from the group consisting of ethylene-propylene copolymer, ethylene-butene copolymer, ethylene-hexene, ethylene-octene, and ethylene-decene.

21. The process of any of paragraphs 1 to 19, wherein Component B is a terpolymer selected from the group consisting of: ethylene-butene-propylene, ethylene-hexene-propylene, ethylene-octene-propylene, and ethylene-decene-propylene.

22. An ethylene-based in-reactor composition made by the process of any of paragraphs 1 to 21, comprising Component A and Component B, wherein the ethylene-based in-reactor composition has an elongation at break of greater than 100%.

23. An ethylene-based in-reactor composition comprising:
(a) from about 20 wt % to about 50 wt % of a Component A polymer, based on the weight of the in-reactor composition;
wherein Component A comprises 100 wt % to 50 wt % ethylene derived units and 0 wt % to 50 wt % $C_3$ and/or $C_4$ to $C_{20}$ alpha olefin derived units, based on the weight of Component A;
(b) from about 80 wt % to about 50 wt % of a Component B copolymer, based on the weight of the in-reactor composition;
wherein Component B comprises 70 wt % to 100 wt % propylene derived units and 0 wt % to 30 wt % $C_2$ to $C_{20}$ alpha olefin derived units, based on the weight of Component B;
wherein the total ethylene content of the ethylene-based in-reactor composition ranges from 20 wt % to 75 wt %;
wherein the ethylene-based in-reactor composition has a multimodal melting point and an elongation at break of greater than 100%.

24. The composition of paragraph 23, wherein the ethylene-based in-reactor composition has more than 1 and less than 200 regio defects (defined as the sum of 2,1-erythro and 2,1-threo insertions, and 3,1-isomerizations) per 10,000 propylene units.

25. The composition of paragraph 23 or 24, wherein the ethylene-based in-reactor composition has an average meso run length of 35 or more, alternately 40 or more.

26. The composition of paragraph 23, 24 or 25, wherein the ethylene-based in-reactor composition has a multimodal melting point, where at least one melting point is 140° C. or more.

27. The composition of paragraph 23, 24, 25 or 26, wherein the ethylene-based in-reactor composition has a multimodal melting point, where a first melting point is preferably from about 115° C. to about 130° C., and a second melting point is preferably from about 140° C. to about 165° C.

Examples

Tests and Materials

The following abbreviations are used in the Examples: h is hours, min is minutes, Me is methyl, and Bu is butyl.

Gel Permeation Chromatography-DRI (GPC-DRI)

Mw, Mn and Mw/Mn are determined by using a High Temperature Gel Permeation Chromatography (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation.

$$\log M_X = \frac{\log(K_X/K_{PS})}{a_X + 1} + \frac{a_{PS} + 1}{a_X + 1}\log M_{PS}$$

where the variables with subscript "X" stand for the test sample while those with subscript "PS" stand for PS. In this method, $a_{PS}$=0.67 and $K_{PS}$=0.000175 while $a_X$ and $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, $I_{DRI}$, using the following equation:

$$C = K_{DRI}I_{DRI}/(dn/dc)$$

where $K_{DRI}$ is a constant determined by calibrating the DRI, and (dn/dc) is the refractive index increment for the system. Specifically, dn/dc=0.109 for both PE and PP.

The mass recovery is calculated from the ratio of the integrated area of the concentration chromatography over elution volume and the injection mass which is equal to the predetermined concentration multiplied by injection loop volume.

All molecular weights are reported in g/mol unless otherwise noted.

Melt Flow Rate (MFR)

MFR was measured as per ASTM D1238, condition L, at 230° C. and 2.16 kg load.

Differential Scanning Calorimetry (DSC)

Peak crystallization temperature ($T_c$) and peak melting temperature ($T_m$) were measured via Differential Scanning calorimetry (DSC) using a DSCQ200 unit. The sample was first equilibrated at 25° C. and subsequently heated to 220° C. using a heating rate of 10° C./min (first heat). The sample was held at 220° C. for 3 min. The sample was subsequently cooled down to −100° C. with a constant cooling rate of 10° C./min (first cool). The sample was equilibrated at −100° C. before being heated to 220° C. at a constant heating rate of 10° C./min (second heat). The exothermic peak of crystallization (first cool) was analyzed using the TA Universal Analysis software and the corresponding to 10° C./min cooling rate was determined. The endothermic peak of melting (second heat) was also analyzed using the TA Universal Analysis software and the peak melting temperature ($T_m$) corresponding to 10° C./min heating rate was determined. Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Secant Flexural Modulus

1% secant flexural modulus was measured using a ISO 37-Type 3 bar, with a crosshead speed of 1.0 mm/min and a support span of 30.0 mm using an Instron machine according to ASTM D 790 (A, 1.0 mm/min).

$^{13}$C NMR

Ethylene, propylene and hexene content were determined as follows. Samples were dissolved in d2-1,1,2,2-tetrachloroethane at concentrations between 10 to 15 wt % in a 10 mm NMR tube. $^{13}$C NMR data was collected at 120° C. using a Varian 400 spectrometer with a $^1$H frequency of 700 MHz using a 10 mm broadband probe. A 90 degree pulse and full nuclear overhauser effect with decoupling, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest (4000 scans, for polymers having 20 mol % propylene or more and 8000 scans for polymers having less than 20 mol % propylene). Chemical shifts were referenced by setting the most intense propylene methyl group signal to 21.83 ppm. Carbon NMR spectroscopy was used to measure the composition of the reactor products as submitted.

Chemical shift assignments for the homo-polypropylene component are found at L. Resconi, L. Cavallo, A. Fait, and F. Piemontesi, Chem. Rev. 2000, 100, pp. 1253-1345 and the ethylene hexene copolymer shift assignments are described by Randall in 'A Review Of High Resolution Liquid $^{13}$Carbon Nuclear Magnetic Resonance Characterization of Ethylene-Based Polymers', Polymer Reviews, 29:2, pp. 201-317 (1989). Propylene-hexene copolymer shift assignments are found at Escher, F. F. N and Galland, G. B. Journal of Polymer Science Part A: Polymer Chemistry, 42: pp. 2474-2482 (2004).

Homo-polypropylene can have signals which overlap with any residual propylene-hexene or propylene-ethylene copolymers when in the same sample. However, since this product is the result of sequentially polymerizing ethylene-hexene and then introducing propylene into the reactor after purging ethylene from it, the presence of propylene-ethylene copolymer is unlikely. In fact the CNMR spectrum does not show any resonances for ethylene-propylene copolymer.

Concentrations of each species made by sequentially polymerizing ethylene/hexene, and propylene were calculated as follows.

The ethylene copolymer content is determined from the intensities of the (E) centered triads (EEE+EEH+HEH) and the hexene copolymer content from the intensities of the hexene (H) centered triads (HHH, HHE, EHE). Using the nomenclature of Randall the spectral intensities used to determine the individual triads amounts for the ethylene content are: EEE=0.5*($\delta^+\delta^+$+0.5*$\gamma\delta^+$); EEH+HEE=$\beta\delta^+$; HEH=$\beta\beta$. For the calculation of hexene in EH copolymer: EHE=EHE methine, HHE=EHH methine, and HHH is assumed to be negligible due to the low hexene content. From these triad areas the hexene content and the ethylene content in the ethylene rich copolymer can be calculated.

When the PH copolymer is present, signals from the PH interfere with the calculation of the hexene component of the EH copolymer. In that case, the calculation of the hexene component is based on the intensity of the 2B4 peak for the hexene side chain minus the hexene content calculated for PH copolymer (which can be calculated directly without interference).

The homo-polypropylene component concentration is calculated by summing intensities representing all propylene head-to-tail (H-T) additions to any intensity from propylene units that are part of polymer chain structures that result from the non-H-T addition of propylene; specifically, intensity from the methylenes between adjacent H-T propylene (between 44 and 48 ppm). In these calculations, it is assumed that all propylenes add as H-T, due to overlap of features from non-H-T additions with other portions of the spectra. In the mixtures with only homo-polypropylene, the propylene content is determined from the peak at 44-48.

Propylene-hexene copolymer was calculated as given below: In the samples with propylene-hexene present: the P=PP+½PH. P stands for propylene, H stands for hexene. The comonomer content was determined from the $\alpha\alpha$-CH$_2$ region of the NMR spectrum, (40-50 ppm). The $\alpha\alpha$-CH$_2$ for PP ($I_{PP}$) is between 50-45 ppm, $\alpha\alpha$-CH$_2$ for PH ($I_{PH}$) is between 45-43 ppm, and the HH concentration is considered negligible. Calculations for hexene content: H=½*PH.

The mol % P was determined by the total P intensity*100/total carbon intensity.

Total *P* intensity for homo-*P*=*CH2* at 44–48+½**PH*.

The mol % H in PH was determined by (½*PH)*100/total carbon intensity.

The mol % E was determined by (EEE+EEH+HEH)*100/total carbon intensity.

The mole % H in EH was determined by (EHE+EHH) *100/total carbon intensity-if no PH present, when PH present: mol % EH=2B4 intensity−(½PH)*100/total carbon intensity Total Carbon Intensity=*EEE+EEH+HEH+EHE+ EHH*+Total *P* Intensity+½*PH*.

Weight percent was calculated by:

Wt %*E*=mole %*E**14*100/(mole %*E**14+ mole %*P**42+mole %*H*(*PH+EP*)*84).

Wt %*P*=mole %*P**42*100/(mole %*E**14+ mole %*P**42+mole %*H*(*PH+EP*)*84).

Wt %H in EH=mole %E(in H)*84*100/
(mole %E*14+mole %P*42+mole %H(PH+
EP)*84).

Wt %H in PH=mole %H(in H)*84*100/
(mole %E*14+mole %P*42+mole %H(PH+
EP)*84).

In ethylene and/or propylene copolymers where the comonomer is not hexene, the same procedure as above is employed and the H in the above examples would represent the comonomer. For example, in an ethylene-butene, propylene-butene, or ethylene-propylene-butene copolymer the H would represent the butene monomer, in an ethylene-octene, propylene-octene, or ethylene-propylene-octene copolymer the H would represent the octene monomer, etc. Likewise, in situations where there is more than one comonomer, then the H in the formulae above would represent all the comonomers.

Regio Defect Concentrations by $^{13}C$ NMR $^{13}$Carbon NMR spectroscopy as described above is used to measure stereo and regio defect concentrations in the polypropylene. Chemical shift assignments for the stereo defects (given as stereo pentads) can be found in the literature [L. Resconi, L. Cavallo, A. Fait, and F. Piemontesi, Chem. Rev. 2000, 100, pp. 1253-1345]. Three types of regio defects were quantified: 2,1-erythro, 2,1-threo, and 3,1-isomerization. The structures and peak assignments for these are also given in the reference by Resconi. The concentrations for all defects are quoted in terms of defects per 10,000 monomer units.

The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| regio defect | Chemical shift range (ppm) |
| --- | --- |
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals ($CH_3$, $CH$, $CH_2$), and multiplied by 10,000 to determine the defect concentration per 10,000 monomer units.

Average meso run length is determined by dividing 10,000 by the regio defects (defined as the sum of 2,1-erythro and 2,1-threo insertions, and 3,1-isomerizations) plus stereo defects (defined as ½(mmrr+mmrm+rmrm)*10,000).

EXPERIMENTAL

All solvents were dried over calcined alumina beads. Polymerizations were carried out in a 2 L autoclave reactor.

Preparation of chlorodimethyl(2-methyl-4-phenyl-1H-indenyl)silane

To a colorless solution of dichlorodimethylsilane (12.90 g, 100 mmol, 3.00 eq.) in ether (30 mL) at −30° C. was added lithium (2-methyl-4-phenylindenide) (7.07 g, 33.3 mmol, 1.00 equiv.) in portions to give a cloudy yellow mixture. The reaction was allowed to warm to room temperature and stirred for 4 hours, becoming cloudy white with precipitate. The mixture was evaporated under vacuum, leaving a white solid. The solid was extracted with pentane (40 mL) and the extract was filtered to give a light yellow solution and white solid. The solution was evaporated under vacuum, leaving a white solid. Yield 9.85 g (99%). $^1$H NMR ($C_6D_6$): δ 7.59 (d, 2H), 7.44 (m, lH), 7.36 (m, 3H), 7.22 (m, 2H), 6.86 (d, 1H), 3.42 (d, lH), 2.11 (d, 3H), 0.27 (s, 3H), −0.03 (s, 3H).

Preparation of dimethyl(2-methyl-4-phenyl-1H-indenyl)(2,3,4,5-tetramethylcyclopenta-dienyl)silane To a light yellow solution of chlorodimethyl(2-methyl-4-phenyl-1H-indenyl)silane (9.40 g, 31.4 mmol, 1.00 eq.) in tetrahydrofuran (40 mL) at −30° C. was added sodium (tetramethylcyclopentadienide) (4.76 g, 33.0 mmol, 1.05 equiv.) in portions to give a cloudy orange solution. The reaction was allowed to warm to room temperature and stirred for 23 hours. The mixture was evaporated under vacuum leaving an orange residue. The residue was extracted with pentane (50 mL) and the extract was filtered to give a bright yellow solution and yellow solid. The solution was evaporated under vacuum to yield thick, orange oil. Yield 10.16 g (84%). $^1$H NMR ($C_6D_6$): δ 7.61 (d, 2H), 7.41 (m, lH), 7.31 (m, 4H), 7.19 (m, lH), 6.85 (s, lH), 3.60, (s, lH), 3.16 (br s, lH), 2.00 (s, 3H), 1.93 (s, 3H), 1.88 (s, 3H), 1.82 (s, 6H), −0.23 (s, 3H), −0.24 (s, 3H).

Preparation of dilithium (tetramethylcyclopentadienide)dimethylsilyl(2-methyl-4-phenylindenide)etherate To a yellow-orange solution of dimethyl(2-methyl-4-phenyl-1H-indenyl)(2,3,4,5-tetramethylcyclopentadienyl)silane (10.06 g, 26.2 mmol, 1.00 eq.) in ether (40 mL) at −30° C. was added 2.63M butyllithium in hexanes (20.5 mL, 53.9 mmol, 2.06 equiv.) to give an orange solution which quickly turned bright yellow with precipitate. The reaction was stirred 20 hours, and then filtered to give an orange solution and yellow-orange solid. The solid was washed with pentane (30 mL) and dried under vacuum. Yield 12.14 g (99%). $^1$H NMR ($C_6D_6$): δ 7.72 (dd, 2H), 7.49 (br s, lH), 7.27 (t, 2H), 7.10 (m, 1H), 6.48 (t, lH), 6.12, (s, lH), 3.40 (q, 4H), 2.44 (s, 3H), 2.15 (s, 6H), 1.90 (s, 6H), 1.13 (t, 6H), 0.65 (br s, 6H).

Preparation of dimethylsilyl(Tetramethylcyclopentadienyl)(2-methyl-4-phenylindenyl)zirconium dichloride To a white suspension of zirconium tetrachloride bis(etherate) (2.00 g, 5.25 mmol, 1.00 eq.) in ether (25 mL) at −30 C was added dilithium (tetramethylcyclopentadienide)dimethylsilyl(2-methyl-4-phenylindenide)etherate (2.47 g, 5.25 mmol, 1.00 equiv.) in portions to give a cloudy, dull yellow mixture that slowly turned bright yellow. The reaction was stirred 21 hours and then evaporated under vacuum, leaving yellow solid. The solid was extracted with dichloromethane (50 mL, then 2×10 mL) and the extracts were filtered to give a yellow-orange solution and dull yellow solid. The solution was evaporated under vacuum to yield yellow solid. The solid was washed with pentane (2×30 mL) and dried under vacuum. Yield 2.44 g (85%). $^1$H NMR ($CD_2Cl_2$): 8 7.71. (d, 2H), 7.60 (d, lH), 7.46 (t, 2H), 7.41 (m, lH), 7.29 (d, lH), 7.06 (m, lH), 7.01 (s, 1H), 2.29 (s, 3H), 2.08 (s, 3H), 1.98 (s, 3H), 1.92 (s, 3H), 1.88 (s, 3H), 1.23 (s, 3H), 1.12 (s, 3H).

Supported dimethylsilyl(Tetramethylcyclopentadienyl)(2-methyl-4-phenylindenyl)-zirconium dichloride. [Catalyst A]

30 wt % MAO in toluene (6.25 g, 32.3 mmol, 120 equiv.) and toluene (6.50 g) were combined and stirred 15 minutes to give a clear solution. To this MAO solution was added dimethylsilyl [(tetramethylcyclopentadienyl)(2-methyl-4-phenylindenyl)]zirconium dichloride (0.147 g, 0.27 mmol, 1.00 equiv.) to give an orange-red solution. The reaction was stirred 15 minutes and then Davison 948 silica (5.00 g, dried at 600° C.) was added. The orange solid was mixed 10 minutes, then dried under vacuum for 22 hours. Yield 6.87 g (98%) burnt-orange solid.

Polymerization Reactions

Experiment 1

A 2 liter autoclave was loaded with 15 mls of hexene, 400 mls of isobutane, and 100 microliters of tri-n-octylaluminum. 130 psi (896 kPa) of ethylene was added to the reactor and heated to 85° C. 50 mgs of supported Catalyst A were injected as a dry powder with an over pressure of ethylene (100 psi, 689 kPa) into the reactor. The polymerization was allowed to consume ethylene for 20 minutes after which the reactor was slowly vented. During the venting process the reactor was cooled to room temperature. The reactor was purged with nitrogen for 30 minutes. Propylene was added in 200 ml portions while maintaining approximately a 70° C. reactor. A total of 1250 mls of propylene were added; the polymerization was allowed to occur for 45 minutes. The reactor was vented, cooled to room temperature, and the polymer resin was allowed to dry under a nitrogen purge. 64 grams of polymer were obtained. IR analysis: 50 wt % ethylene. DSC $2^{nd}$ melt: $T_m$ (° C.) 118.4 & 147.6: (GPC Mn=60,638 g/mol, Mw=292,600 g/mol, Mw/Mn=4.83); $^{13}$C NMR: Ethylene mol % 55.2; Propylene mol % 43.6; Hexene mol % 1.2; average meso run length 36; regio defects 31.

Experiment 2

A 2 liter autoclave was loaded with 15 mls of hexene, 400 mls of isobutane, and 100 microliters of trioctylaluminum. 130 psi (896 kPa) of ethylene was added to the reactor and heated to 85° C. 25 mgs of supported Catalyst A were injected with an over pressure of ethylene (100 psi, 689 kPa) into the reactor. The polymerization was allowed to consume ethylene for 20 minutes after which the reactor was slowly vented. During the venting process the reactor was cooled to room temperature. After the pressure was less than 2.5 psi (17 kPa), propylene was added in 200 ml portions while maintaining approximately a 70° C. reactor. A total of 1250 mls of propylene were added and the polymerization was allowed to occur for 45 minutes. The reactor was vented, cooled to room temperature, and the polymer resin was allowed to dry under a nitrogen purge. 100 grams of copolymer were obtained. IR analysis: 65 wt % ethylene. DSC: $T_m$ (° C.) 117 & 146.7: (GPC Mn=98,700 g/mol, Mw=437,600 g/mol, Mw/Mn=4.43); $^{13}$C NMR: Ethylene mol % 84.15; Propylene mol % 14.12; Hexene mol % 1.73; average meso run length 43; stereo defects 234; regio defects 0.

Experiment 3

A 2 liter autoclave was loaded with 15 mls of hexene, 400 mls of isobutane, and 100 microliters of tri-n-octylaluminum. 130 psi (896 kPa) of ethylene was added to the reactor and heated to 85° C. 25 mgs of supported Catalyst A were injected with an over pressure of ethylene (100 psi, 689 kPa) into the reactor. The polymerization was allowed to consume ethylene for 10 minutes after which the reactor was slowly vented. During the venting process the reactor was cooled to 70° C. After the pressure was less than 50 psi (344 kPa) and the reactor had stabilized to 70° C., propylene was added in 200 ml portions while maintaining approximately a 70° C. reactor. A total of 800 mls of propylene were added; the polymerization was allowed to occur for 45 minutes. The reactor was vented, cooled to room temperature, and the polymer resin was allowed to dry under a nitrogen purge. 48.5 grams of copolymer were obtained. DSC: $T_m$ (° C.) 119.8 & 142.8: (GPC Mn=57,800 g/mol, Mw=282,100 g/mol, Mw/Mn=4.88); $^{13}$C NMR: Ethylene mol % 65.85; Propylene mol % 32.75; Hexene mol % 1.40; average meso run length 43; regio defects 8.

Experiment 4

A 2 liter autoclave was loaded with 15 mls of hexene, 400 mls of isobutane, and 100 microliters of tri-n-octylaluminum. 130 psi (896 kPa) of ethylene was added to the reactor and heated to 85° C. 25 mgs of supported Catalyst A were injected with an over pressure of ethylene 100 psi (689 kPa) into the reactor. The polymerization was allowed to consume ethylene for 30 minutes after which the reactor was slowly vented. During the venting process the reactor was cooled to 70° C. After the pressure was less than 50 psi (344 kPa) and the reactor had stabilized to 70° C., propylene was added in 200 ml portions while maintaining approximately a 70° C. reactor. A total of 800 mls of propylene were added and the polymerization was allowed to occur for 45 minutes. The reactor was vented, cooled to room temperature, and the polymer resin was allowed to dry under a nitrogen purge. 57.6 grams of copolymer were obtained. DSC: $T_m$ (° C.) 122.4 & 147: (GPC Mn=62,500 g/mol, Mw=225,400 g/mol, Mw/Mn=3.61); $^{13}$C NMR: Ethylene mol % 25.84; Propylene mol % 73.82; Hexene mol % 0.34%; average meso run length 41; regio defects 12.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A process for producing ethylene-based in-reactor compositions comprising:
   a) contacting ethylene and optionally a $C_3$ to a $C_{12}$ alpha-olefin comonomer under polymerization conditions in a first stage in the presence of a first metallocene catalyst system to form Component A;
   b) contacting Component A of step (a) with a $C_3$ to a $C_{12}$ alpha-olefin monomer under polymerization conditions in a second stage in the presence of a second metallocene catalyst system to form Component B, wherein the first metallocene catalyst system is present in both steps a and b and/or additional metallocene catalyst is added to the reaction mixture between steps a and b and the first metallocene catalyst system may be the same as the second metallocene catalyst system; and c) obtaining an ethylene-based in-reactor composition comprising Component A and Component B, wherein the ethylene-based in-reactor composition has from greater than 20% to about 85% of ethylene on a mole percentage basis and wherein the polymer composition has a multimodal melting point.

2. The process of claim 1, wherein Component A is produced by the first metallocene catalyst system which is the same as or different from the second metallocene catalyst system, wherein each metallocene catalyst system, independently, comprises: (i) a metallocene compound comprising a group 4, 5, or 6 metal; (ii) an activator; and (iii) a support material.

3. The process of claim 2, wherein the first metallocene catalyst system is the same as the second metallocene catalyst system.

4. The process of claim 2, wherein the process comprises 0 wt % diene monomer.

5. The process of claim 1, wherein each metallocene catalyst system, independently, comprises a metallocene compound represented by the following formula:

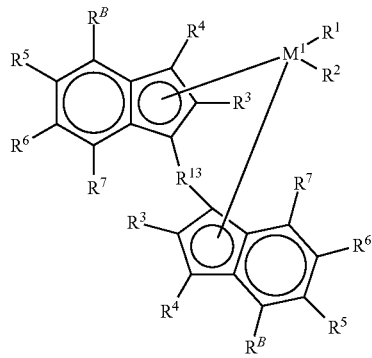

wherein:
$M^1$ is selected from titanium, zirconium, hafnium, vanadium, niobium, tantalum, chromium, molybdenum and tungsten;

$R^1$ and $R^2$ are selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; optionally $R^1$ and $R^2$ are joined together to form a $C_4$ to $C_{40}$ alkanediyl group or a conjugated $C_4$ to $C_{40}$ diene ligand which is coordinated to $M^1$ in a metallacyclopentene fashion; optionally $R^1$ and $R^2$ represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a π complex with $M^1$;

each $R^3$ and RB is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups;

$R^4$, $R^5$, $R^6$, and $R^7$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and $C_7$ to $C_{40}$ substituted or unsubstituted arylalkenyl groups; and $R^{13}$ is selected from:

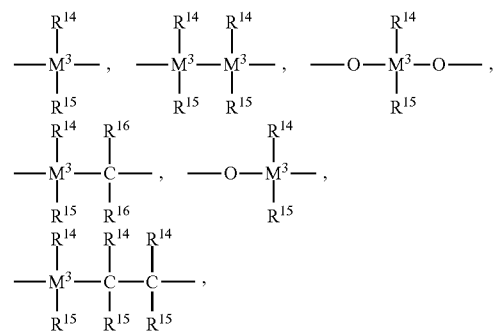

—B($R^{14}$)—, —Al($R^{14}$)—, —Ge—, —Sn—, —O—, —S—, —SO—, —SO$_2$—, —N($R^{14}$)—, —CO—, —P($R^{14}$)—, and —P(O)($R^{14}$)—;

wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups and $C_7$ to $C_{40}$ alkylaryl groups, optionally $R^{14}$ and $R^{15}$, together with the atom(s) connecting them, form a ring; and $M^3$ is selected from carbon, silicon, germanium, and tin; or $R^{13}$ is represented by the formula:

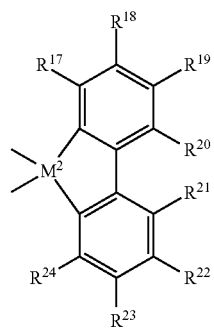

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups and substituted or unsubstituted $C_8$ to $C_{40}$ arylalkenyl groups; optionally two or more adjacent radicals $R^{17}, R^{18}, R^{19}, R^{20}, R^{21}, R^{22}, R^{23}$, and $R^{24}$, including $R^{20}$ and $R^{21}$, together with the atoms connecting them, form one or more rings; and $M^2$ represents one or more carbon atoms, or a silicon, germanium, or tin atom.

6. The process of claim 1, wherein each metallocene catalyst system, independently, comprises a metallocene compound by the following formula:

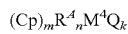

wherein each Cp is a cyclopentadienyl or a cyclopentadienyl substituted by one or more hydrocarbyl radical having from 1 to 20 carbon atoms;

$R^4$ is a structural bridge between two Cp rings;

$M^4$ is a transition metal selected from groups 4 or 5;

Q is a hydride or a hydrocarbyl group having from 1 to 20 carbon atoms or an alkenyl group having from 2 to 20 carbon atoms, or a halogen;

m is 1, 2, or 3, with the proviso that if m is 2 or 3, each Cp may be the same or different;

n is 0 or 1, with the proviso that n=0 if m=1; and k is such that k+m is equal to the oxidation state of M, with the proviso that if k is greater than 1, each Q may be the same or different.

7. The process of claim 1, wherein each metallocene catalyst system, independently, comprises a metallocene compound represented by the formula:

wherein:

each Cp is a cyclopentadienyl or substituted cyclopentadienyl ring;

each R* and R" is a hydrocarbyl group having from 1 to 20 carbon atoms and may the same or different;

p is 0, 1, 2, 3, or 4;

q is 1, 2, 3, or 4;

$R^4$ is a structural bridge between the Cp rings imparting stereorigidity to the metallocene compound;

$M^5$ is a group 4, 5, or 6 metal;

Q is a hydrocarbyl radical having 1 to 20 carbon atoms or is a halogen;

r is s−2, where s is the valence of $M^5$;

wherein $(CpR^*_q)$ has bilateral or pseudobilateral symmetry; $R^*_q$ is selected such that $(CpR^*_q)$ forms a fluorenyl, alkyl substituted indenyl, or tetra-, tri-, or dialkyl substituted cyclopentadienyl radical; and $(CpR''_p)$ contains a bulky group in one and only one of the distal positions; wherein the bulky group is of the formula $AR^w_v$; and where A is chosen from group 4 metals, oxygen, or nitrogen, and $R^w$ is a methyl radical or phenyl radical, and v is the valence of A minus 1.

8. The process of claim 1, wherein each metallocene catalyst system, independently, comprises a metallocene compound represented by the formula:

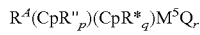

wherein:

each Cp is a cyclopentadienyl or substituted cyclopentadienyl ring;

each R* and R" is a hydrocarbyl group having from 1 to 20 carbon atoms and may be the same or different;

p is 0, 1, 2, 3, or 4;

q is 1, 2, 3, or 4;

$R^4$ is a structural bridge between the Cp rings imparting stereorigidity to the metallocene compound;

$M^5$ is a group 4, 5, or 6 metal;

Q is a hydrocarbyl radical having 1 to 20 carbon atoms or is a halogen;

r is 0, 1, 2, or 3; and wherein R*q is selected such that $(CpR^*_q)$ is a sterically different ring than $(CpR''_p)$.

9. The process of claim 1, wherein each metallocene catalyst system, independently, comprises an activator of alumoxane and/or an ionic stoichiometric activator.

10. The process of claim 9, wherein the ionic stoichiometric activator is selected from the group consisting of: triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate.

11. The process of claim 1, wherein each metallocene catalyst system, independently, comprises a support material selected from the group consisting of silica, alumina, silica aluminates and clay.

12. The process of claim 1, wherein each metallocene catalyst system, independently, comprises a support material calcined to a temperature of from about 550° C. to about 650° C.

13. The process of claim 1, wherein each metallocene catalyst system, independently, comprises a support material treated with an alkyl aluminum compound.

14. The process of claim 13, wherein the alkyl aluminum compound is one or more of trimethyl aluminum, triethyl aluminum, tri-n-octyl aluminum, tri-isobutyl aluminum, tri-n-hexyl aluminum, and dimethyl aluminum fluoride.

15. The process of claim 1, further comprising adding trimethylaluminum, triethylaluminum, triisobutylaluminum, tri-n-octylaluminum, trihexylaluminum, and/or diethylzinc, in step (a).

16. The process of claim 1, wherein both the first and second stages are carried out in the gas phase.

17. The process of claim 1, wherein the polymerization conditions comprise a pressure of from about 965 kPa to about 5171 kPa and a temperature of from about 50° C. to 100° C.

18. The process of claim 1, further comprising introducing Component A from step (a) into an intermediate stage, and depressurizing to less than 517 kPa, before step (b).

19. The process of claim 1, wherein step (a) comprises 0 wt % $C_3$ and/or $C_4$ to $C_{20}$ alpha olefin, and Component A is an ethylene homopolymer.

20. The process of claim 1, wherein Component B is selected from the group consisting of ethylene-propylene copolymer, ethylene-butene copolymer, ethylene-hexene, ethylene-octene, and ethylene-decene.

21. The process of claim 1, wherein Component B is a terpolymer selected from the group consisting of: ethylene-butene-propylene, ethylene-hexene-propylene, ethylene-octene-propylene, and ethylene-decene-propylene.

22. The process of claim 1, wherein the time period between generating the polyethylene and further reacting the polyethylene with propylene is 1 second or more.

* * * * *